(12) United States Patent  
Fix et al.

(10) Patent No.: US 9,247,441 B2  
(45) Date of Patent: *Jan. 26, 2016

(54) FACILITATION OF DELAY ERROR CORRECTION IN TIMING-BASED LOCATION SYSTEMS

(71) Applicant: AT&T Mobility II LLC, Atlanta, GA (US)

(72) Inventors: Jeremy Fix, Acworth, GA (US); Sheldon Kent Meredith, Marietta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,286

(22) Filed: Oct. 16, 2014

(65) Prior Publication Data

US 2015/0038166 A1   Feb. 5, 2015

Related U.S. Application Data

(63) Continuation of application No. 13/551,369, filed on Jul. 17, 2012, now Pat. No. 8,892,054.

(51) Int. Cl.  
*H04B 17/21*    (2015.01)  
*H04W 24/02*    (2009.01)  
*H04W 24/10*    (2009.01)  
(Continued)

(52) U.S. Cl.  
CPC ............ *H04W 24/02* (2013.01); *G01S 5/021* (2013.01); *G01S 5/0252* (2013.01); *H04B 17/21* (2015.01); *H04W 4/02* (2013.01); *H04W 24/10* (2013.01);  
(Continued)

(58) Field of Classification Search  
CPC ........ H04W 4/02; H04W 64/00; H04B 17/21; H04B 17/26  
USPC .......... 455/67.16, 456.1, 67.11, 456.5, 456.6, 455/67.13, 63.1; 343/357.53, 357.46  
See application file for complete search history.

(56) References Cited

U.S. PATENT DOCUMENTS

| 4,718,081 A | 1/1988 | Brenig |
| 5,515,062 A | 5/1996 | Maine et al. |

(Continued)

FOREIGN PATENT DOCUMENTS

| EP | 0856746 A2 | 8/1998 |
| EP | 1145526 | 10/2001 |

(Continued)

OTHER PUBLICATIONS

Notice of Allowance mailed Aug. 12, 2013, for U.S. Appl. No. 13/174,541, 40 pages.

(Continued)

*Primary Examiner* — John J Lee  
(74) *Attorney, Agent, or Firm* — Amin, Turocy & Watson, LLP

(57) ABSTRACT

Computation of delay error offset information is facilitated. A method can include receiving measurement information indicative of a location of a mobile device, calibrating the measurement information resulting in calibrated measurement information, comparing the calibrated measurement information and historical calibrated measurement information, and computing a measurement error based, at least, on the comparing, wherein the measurement error includes delay error offset information.

20 Claims, 10 Drawing Sheets

(51) Int. Cl.
  *H04W 64/00* (2009.01)
  *G01S 5/02* (2010.01)
  *H04W 4/02* (2009.01)
  *H04B 17/27* (2015.01)
  *H04B 17/364* (2015.01)
  *H04B 17/26* (2015.01)

(52) U.S. Cl.
  CPC ............... *H04W 64/00* (2013.01); *H04B 17/26* (2015.01); *H04B 17/27* (2015.01); *H04B 17/364* (2015.01)

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B2 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,897,805 B2 | 11/2014 | Fix et al. |
| 8,909,247 B2 | 12/2014 | Tipton et al. |
| 9,008,684 B2 | 4/2015 | Tipton et al. |
| 9,008,698 B2 | 4/2015 | Meredith et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0092448 A1* | 5/2003 | Forstrom et al. ............... 455/456 |
| 2003/0095065 A1 | 5/2003 | Ericson et al. |
| 2003/0097330 A1 | 5/2003 | Hillmer et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0024639 A1 | 2/2004 | Goldman et al. |

(56) References Cited

U.S. PATENT DOCUMENTS

| | | |
|---|---|---|
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0200303 A1 | 9/2006 | Fuentes et al. |
| 2006/0240839 A1 | 10/2006 | Chen et al. |
| 2006/0267841 A1 | 11/2006 | Lee et al. |
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0121560 A1 | 5/2007 | Edge |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0181695 A1 | 7/2009 | Wirola et al. |
| 2009/0227265 A1 | 9/2009 | Kang et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0144452 A1 | 6/2012 | Dyor et al. |
| 2012/0158289 A1 | 6/2012 | Bernheim Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |

(56) References Cited

U.S. PATENT DOCUMENTS

| | | | |
|---|---|---|---|
| 2013/0007058 A1 | 1/2013 | Meredith et al. | |
| 2013/0023237 A1 | 1/2013 | Meredith et al. | |
| 2013/0023274 A1 | 1/2013 | Meredith et al. | |
| 2013/0023281 A1 | 1/2013 | Meredith et al. | |
| 2013/0053057 A1 | 2/2013 | Cansino et al. | |
| 2013/0066748 A1 | 3/2013 | Long | |
| 2013/0096966 A1 | 4/2013 | Barnes | |
| 2013/0109407 A1 | 5/2013 | Tipton et al. | |
| 2013/0137464 A1 | 5/2013 | Kramer et al. | |
| 2013/0281111 A1 | 10/2013 | Syrjarinne et al. | |
| 2013/0324149 A1 | 12/2013 | Fix et al. | |
| 2013/0337824 A1 | 12/2013 | Meredith et al. | |
| 2014/0062782 A1* | 3/2014 | Abraham | 342/357.73 |
| 2014/0122220 A1 | 5/2014 | Bradley et al. | |
| 2014/0171060 A1 | 6/2014 | Cook et al. | |
| 2014/0278744 A1 | 9/2014 | Lo Faro et al. | |

FOREIGN PATENT DOCUMENTS

| | | | |
|---|---|---|---|
| JP | 2004069609 A | 3/2004 | |
| JP | 2005091303 A | 4/2005 | |
| JP | 2007328050 A | 12/2007 | |
| WO | 2006031035 A1 | 3/2006 | |

OTHER PUBLICATIONS

Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis.pdf.
MySociety (Web page), "More travel-time maps and their uses", 2007, downloaded from http://www.mySociety.org/20071more-travel-maps/, 10 pages total (including a single page Examiner's attachment showing the operation of the interactive travel-time map). Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements.
3GPP TS 25.331 V6.9.0 (Mar. 2006) RRC protocol for the UE-UTRAN radio interface.
3GPP TS 25.413 V6.9.0 (Mar. 2006) UTRAN lu interface RANAP signalling.
Calabrese, et al., "Real-Time Urban Monitoring Using Cell Phones: A Case Study in Rome". IEEE Transactions on Intelligent Transportation Systems, 12 pages. (http://senseable.mitedu/papers/pdf/2010_Calabrese_et_al_Rome_TITS.pdf). Retrieved on Sep. 29, 2012, 11 pages.
Smith, et al., "Airsage Overview", (http://mikeontrathc.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, Timo Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Notice of Allowance dated Aug. 21, 2014 for U.S. Appl. No. 13/447,069, 78 pages.

(56) References Cited

OTHER PUBLICATIONS

Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Oct. 22, 2014 for U.S. Appl. No. 13/557,425, 59 pages.
Office Action dated Aug. 11, 2014 for U.S. Appl. No. 14/279,176, 22 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages."
"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages."
"Drucker, et al. Support Vector Regression Machines.http://scholar.google.com/scholar?q=%22Support+Vector+Regression+Machines.%22. Last accessed Dec. 24, 2010, 7 pages."
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.
Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Office Action dated Apr. 8, 2014 for U.S. Appl. No. 13/175,199, 52 Pages.

(56) References Cited

OTHER PUBLICATIONS

Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 Pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21 st century dictionary. Retrieved on May 9, 2014 from http://search.credoreference.com/content/entry/chambdict/represent/O.
Represent. (2011). In the american heritage dictionary of the english language. Retrieved on May 9, 2014 from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Final Office Action dated Apr. 3, 2014 for U.S. Appl. No. 13/188,295, 37 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
3rd Generation Partnership Project, Technical Specification, "Group GSM/EDGE Radio Access Network, Radio subsystem synchronization (Release 8)", 3GPP TS 45.010 V8.0.0, May 2008, 30 pages.
3rd Generation Partnership Project, Technical Specification, "Group Radio Access Network, Utran luh interface Home Node B Application Part (HNBAP) signalling (Release 8)", 3GPP TS 25.469 V8.0.0, Dec. 2008, 56 pages.
"Intelligent Transportation System", Published online at [http://en.wikipedia.org/wiki/Intelligent_transportation_system]. Retrieved on Aug. 15, 2011. 7 pages.
Koukoumidis, et al. "SignalGuru: Leveraging Mobile Phones for Collaborative Traffic Signal Schedule Advisory." MobiSys'11, Jun. 28-Jul. 1, 2011, Bethesda, Maryland, USA. Retrieved on Nov. 19, 2011. 14 pages.
"Bitcarrier Technology", Published online at [http://www.bitcarrier.com/technology]. Retrieved on Aug. 15, 2011. 1 page.
Hao, et al. "Estimating Vehicle Position in a Queue at Signalized Intersections Using Simple Travel Times from Mobile Sensors." Retrieved on Nov. 19, 2011. 6 pages.

Girardin, et al., "Digital footprinting: Uncovering tourists with user generated content." Pervasive Computing, IEEE 7.4, Oct.-Nov. 2008. 8 pages.
Stein Field, "The development of location based services in mobile commerce." ELife after the Dot Corn Bust. PhysicaVerlagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Notice of Allowance mailed Jan. 21, 2015 for U.S. Appl. No. 13/495,391, 98 pages.
Notice of Allowance mailed Feb. 6, 2015 for U.S. Appl. No. 13/204,535, 20 pages.
Office Action dated Feb. 13, 2015 for U.S. Appl. No. 13/188,136, 44 pages.
Office Action dated Apr. 16, 2015 for U.S. Appl. No. 14/521,431, 82 pages.
Notice of Allowance dated Mar. 19, 2015 for U.S. Appl. No. 13/494,959, 41 pages.
Notice of Allowance dated Mar. 26, 2015 for U.S. Appl. No. 14/276,688, 75 pages.
Office Action dated May 1, 2015 for U.S. Appl. No. 13/557,425, 33 pages.
Office Action dated May 14, 2015 for U.S. Appl. No. 14/530,605, 72 pages.
Office Action dated Jun. 1, 2015 for U.S. Appl. No. 13/447,072, 38 pages.
Office Action dated May 20, 2015 for U.S. Appl. No. 13/526,988, 52 pages.
Office Action dated Jun. 9, 2015 for U.S. Appl. No. 13/495,756, 35 pages.
Notice of Allowance dated Jul. 8, 2015 for U.S. Appl. No. 14/548,901, 125 pages.
Buford, et al., Location Privacy Enforcement in a Location-Based Services Platform, 2009, IEEE, 5 pages.
Philips, Jr., et al., "Information Sharing and Security in Dynamic Coalitions," SACMAT, Jun. 2002, pp. 87-96, ACM, 10 pages.
Moniruzzaman, et al., "A Study of Privacy Policy Enforcement in Access Control Models", Proceedings of 13th International Conference on Computer and Information Technology, Dec. 2010, pp. 352-357, IEEE, 6 pages.
Office Action dated Jul. 22, 2015 for U.S. Appl. No. 13/188,136, 31 pages.
"CELL_DCH", INACON Glossary, http://www.inacon.de/glossary/CELL_DCH.php, Retrieved on Jul. 22, 2015, 1 page.
Office Action dated Sep. 9, 2015 for U.S. Appl. No. 13/495,756, 23 pages.
Office Action dated Sep. 14, 2015 for U.S. Appl. No. 13/557,425, 32 pages.
Office Action dated Sep. 18, 2015 for U.S. Appl. No. 14/641,247, 69 pages.
Notice of Allowance dated Aug. 27, 2015 for U.S. Appl. No. 14/521,431, 39 pages.
Office Action dated Nov. 23, 2015 for U.S. Appl. No. 14/520,287, 80 pages.
Office Action dated Nov. 16, 2015 for U.S. Appl. No. 13/188,136, 31 pages.
Error. (2011). The American Heritage Dictionary of the English Language. Boston, MA: Houghton Mifflin. Retrieved from [http://search.credoreference.com/contentientry/hmdictenglang/error/O], retrieved on Nov. 16, 2015, 2 pages.
Office Action dated Nov. 16, 2015 for U.S. Appl. No. 14/566,657, 87 pages.

* cited by examiner

300

| | 130m | | | | | | | | |
|---|---|---|---|---|---|---|---|---|---|
| 13m | | | | | | | | | |
| 0% | 0% | 0% | 0% | 0% | 0% | 0% | 0% | 0% | 0% |
| 0% | 25% | 25% | 25% | 25% | 25% | 25% | 25% | 25% | 0% |
| 0% | 25% | 50% | 50% | 50% | 50% | 50% | 50% | 25% | 0% |
| 0% | 25% | 50% | 75% | 75% | 75% | 75% | 50% | 25% | 0% |
| 0% | 25% | 50% | 75% | 100% | 100% | 75% | 50% | 25% | 0% |
| 0% | 25% | 50% | 75% | 100% | 100% | 75% | 50% | 25% | 0% |
| 0% | 25% | 50% | 75% | 75% | 75% | 75% | 50% | 25% | 0% |
| 0% | 25% | 50% | 50% | 50% | 50% | 50% | 50% | 25% | 0% |
| 0% | 25% | 25% | 25% | 25% | 25% | 25% | 25% | 25% | 0% |
| 0% | 0% | 0% | 0% | 0% | 0% | 0% | 0% | 0% | 0% |

FIG. 3

FACILITATION OF DELAY ERROR CORRECTION IN TIMING-BASED LOCATION SYSTEMS

RELATED APPLICATION

This patent application is a continuation of, and claims priority to, U.S. patent application Ser. No. 13/551,369 (now U.S. Pat. No. 8,892,054), filed Jul. 17, 2012, and entitled "FACILITATION OF DELAY ERROR CORRECTION IN TIMING-BASED LOCATION SYSTEMS," the entirety of which is hereby incorporated by reference herein.

TECHNICAL FIELD

The subject disclosure relates to wireless communications and, more particularly, to various embodiments that facilitate delay error correction in timing-based location systems.

BACKGROUND

Locating systems are becoming widespread with the onslaught of location-based services. Applications that depend on such services are growing, and the need for accurate measurement information is ever present and compelling.

BRIEF DESCRIPTION OF THE DRAWINGS

FIG. 3 illustrates an example delay error mitigation grid that can be employed to facilitate delay error correction in timing-based location systems.

DETAILED DESCRIPTION

Figure 1:
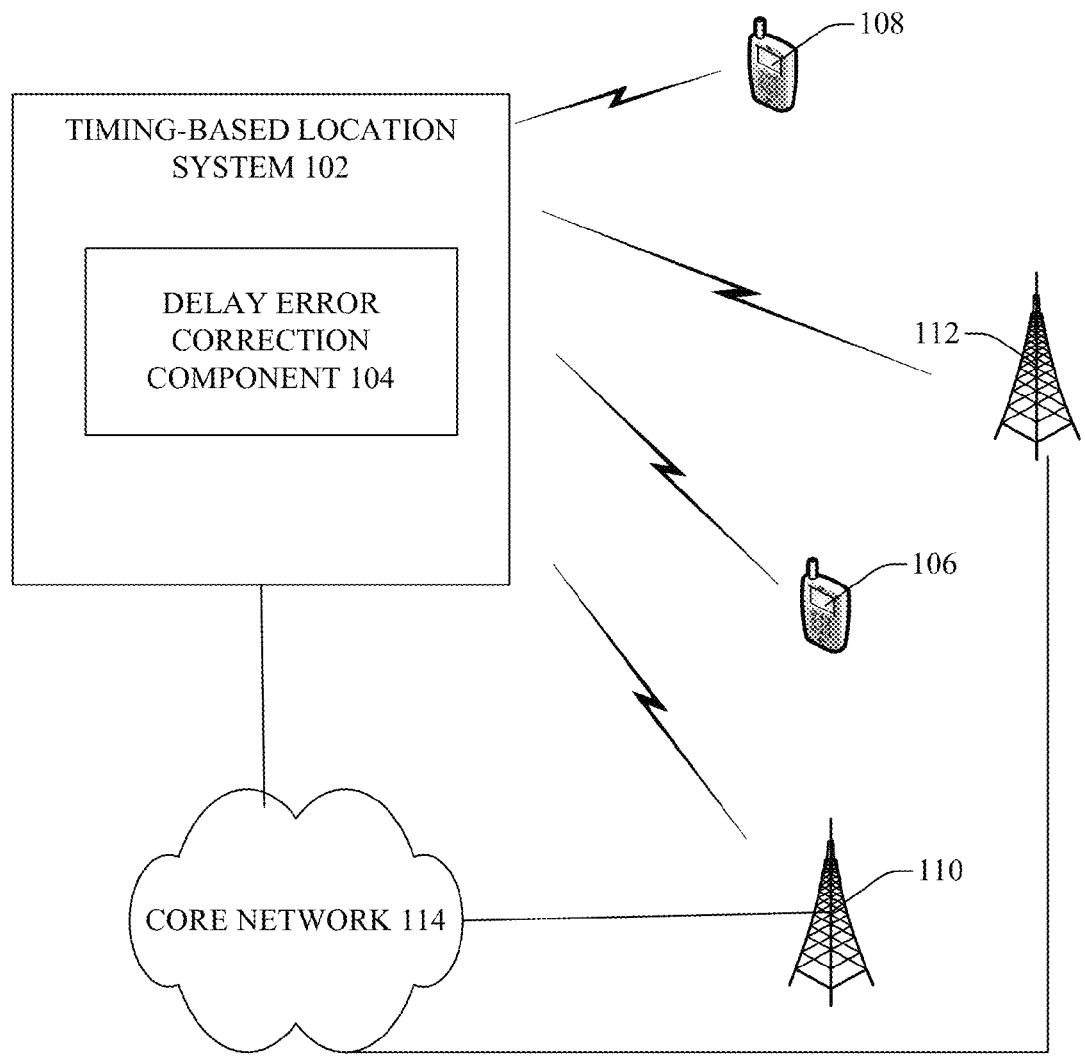
FIG. 1 illustrates an example system that facilitates delay error correction in timing-based location systems.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Moreover, the following descriptions of the various embodiments are intended to neither identify key or critical elements of any of the embodiments nor delineate any scope particular to such embodiments, or any scope of the claims.

As used in this application, the terms "component," "module," "system," "interface," "platform," "service," "framework," "connector," "controller" or the like are generally intended to refer to a computer-related entity, either hardware, a combination of hardware and software, software or software in execution or an entity related to an operational machine with one or more specific functionalities. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application, and/or application programming interface (API) components.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "base station (BS)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

Embodiments described herein can be exploited in substantially any wireless communication technology, including, but not limited to, Wireless Fidelity (Wi-Fi), Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee and other 802.XX wireless technologies and/or legacy telecommunication technologies. Further, the term "femto" and "femtocell" are used interchangeably, and the terms "macro" and "macrocell" are used interchangeably.

Conventional propagation modeling software, which adjusts signals across a signal propagation area, employs static models to represent clutter and terrain data. Accordingly, conventional approaches fail to accurately model dynamic environments resultant from seasonal changes in foliage, unlicensed repeaters and new building and home construction. In real-time location systems, a level of inaccuracy in a system is typically balanced against computational speed and cost as greater accuracy generally results in higher cost and slower speed.

Employing radio resource control (RRC) measurement reporting, and the corresponding procedure, measurement results can be transferred from the mobile device to a UMTS Terrestrial Radio Access Network (UTRAN). The RRC measurement reports can be sent periodically or upon occurrence of an event trigger. Periodic measurements can be setup in the radio network controller (RNC) by the operator in some embodiments.

Timing-based location methods utilize reported measurements from the RRC Measurement Report. These measurements include each individual Primary Scrambling Code (PSC) and an associated measured time difference to cell ($T_M$) measurement.

The PSC represents a single radio carrier, or broadcasting cell. For each PSC, a $T_M$ measurement is reported. Pairs of $T_M$ measurements, between two distinct cells, can be calculated to represent the observed time difference (OTD) between the two cells.

Employing a Radio Access Network Application Part (RANAP) location report, and corresponding procedure, the mobile device location information can be transmitted to the core network (CN). The procedure can employ connection-oriented signaling. In some embodiments, the RANAP location report can be limited to location information based on an Assisted Global Positioning System (AGPS).

The system frame number (SFN)-connection frame number (CFN) OTD is a measurement for handoff timing to identify an active cell and neighbor cell time difference.

The following description and the annexed drawings set forth certain illustrative embodiments of the embodiments. These embodiments are indicative, however, of but a few of the various ways in which the principles of the embodiments can be employed. Other features of the embodiments will become apparent from the following detailed description of the embodiments when considered in conjunction with the drawings.

In one embodiment, a method for delay error correction in timing-based location systems can include: receiving, by a system including a processor, measurement information indicative of a location of a mobile device; calibrating, by the system, the measurement information resulting in calibrated measurement information; comparing, by the system, the calibrated measurement information and historical calibrated measurement information; and computing, by the system, a measurement error based, at least, on the comparing, wherein the measurement error includes delay error offset information. In some embodiments, the method can also include applying the delay error offset information to subsequently received measurement information indicative of a location of a mobile device.

In one embodiment, a system can include: a memory storing computer-executable instructions; and a processor, communicatively coupled to the memory, that facilitates execution of the computer-executable instructions to at least: receive measurement information indicative of a location impacted by a physical obstruction; determine a reference frame of a bin, wherein the bin corresponds to the location; and distribute delay error offset information to a plurality of frames of the bin within a predetermined distance from the reference frame.

In one embodiment, a non-transitory computer-readable storage medium can store computer-executable instructions that, in response to execution, cause a system including a processor to perform operations. The operations can include: determining measurement information indicative of a location associated with a cell site pair; and adjusting the measurement information based, at least, on delay error offset information generated for the measurement information, wherein the delay error offset information is a function of calibration error calculated for the measurement information.

The following description and the annexed drawings set forth certain illustrative embodiments of the embodiments. These embodiments are indicative, however, of but a few of the various ways in which the principles of the embodiments can be employed. Other features of the embodiments can become apparent from the following detailed description of the embodiments when considered in conjunction with the drawings.

In various embodiments described herein, systems and/or methods can determine geographic locations from mobile devices through the use of AGPS location technology. The geographic location can be employed to calibrate BS timing of the UMTS network. As a result, timed fingerprinting of the geographical location of mobile devices can be performed.

In various embodiments, the systems and/or methods described herein can perform the timed fingerprinting of the mobile devices employing binning, calibration, and locating processes.

For example, in some embodiments, the binning process can pre-compute time delay differentials and sensitivities between cell site pairs and fixed geographic bins. As such, binning can be a non-real-time process in some embodiments.

The geographic bins can represent geographic locations in various embodiments. Coordinate references can be used with fixed latitude and longitude offset multipliers allowing integer-based x and y coordinates for simplified indexing and lookup.

Approximately 100 meters of width and height for each bin can be employed in some embodiments. For example, in various embodiments, an approximate 100 m$^2$ size bin can be used with a fixed longitude offset of approximately 0.0012 and a fixed latitude offset of approximately 0.0009. In some embodiments, coordinate references can be employed to represent various different geographic landmasses. For example, in the case of the United States, there can be four landmasses to consider (e.g., Alaska, Hawaii, Puerto Rico, and the Continental United States). The reference point used can represent the southwestern most point to the landmass, which can be the minimum latitude and minimum longitude for the landmass.

In other embodiments, bins of other sizes can be employed to account for differences in geography in various places throughout the United States or world.

Turning now to the calibration, location and multi-lateration processes, the calibration process can be a semi real-time process that can include, but is not limited to, real-time call tracking, AGPS determinations, timing synchronization, PSC translation, calibration of the OTD between cell site pairs, derived calibration and/or calibration requests.

The locating process can be a real-time process that can include, but is not limited to, initial locating calculations, calculation of sensitivity, sensitivity rankings and filters, calculation of least error and final locating results.

The multi-lateration process can be a method of computing location of the mobile device from the time difference of arrival (TDOA) of a signal from multiple (e.g., three or more) transmitters to a single receiver. With respect to W-CDMA, for example, the multiple transmitters can be BSs, while the single receiver can be the mobile device. In some embodiments, calibration is employed in addition to multi-lateration to synchronize cell site measurements.

In various embodiments, an AGPS locate request can be triggered by any number of different types of platforms including, but not limited to, a Location-Based Services (LBS) platform. When a control plane-based request is made, the Gateway Mobile Location Center (GMLC) can send the request to the RNC at which the mobile device is currently active. The mobile device can report periodic and event-based RRC measurement reports containing timing-based information. Further, the mobile device can provide to the CN, through the RANAP location report, the information requested via the AGPS locate request. Information in the RRC measurement report and the RANAP location report can then be synchronized in time to perform error estimation.

FIG. 1 illustrates an example system that facilitates delay error correction in timing-based location systems. The system 100 can include a timing-based location system 102 and a delay error correction (DEC) component 104. In some embodiments, the system 100 can also include one or more mobile devices 106, 108, one or more base stations 110, 112 and a core network 114.

The timing-based location (TBL) system 102 can compute timing-based fingerprint information corresponding to the location for the one or more mobile devices 106, 108.

The DEC component 104 can compute delay error information for facilitating delay error correction in the TBL system 102. In some embodiments, the DEC component 104 can compute adjustments to the timing-based fingerprint information computed for the one or more mobile devices 106, 108 by the TBL system 102. The adjustments can be delay error offset values in some embodiments.

Figure 2:
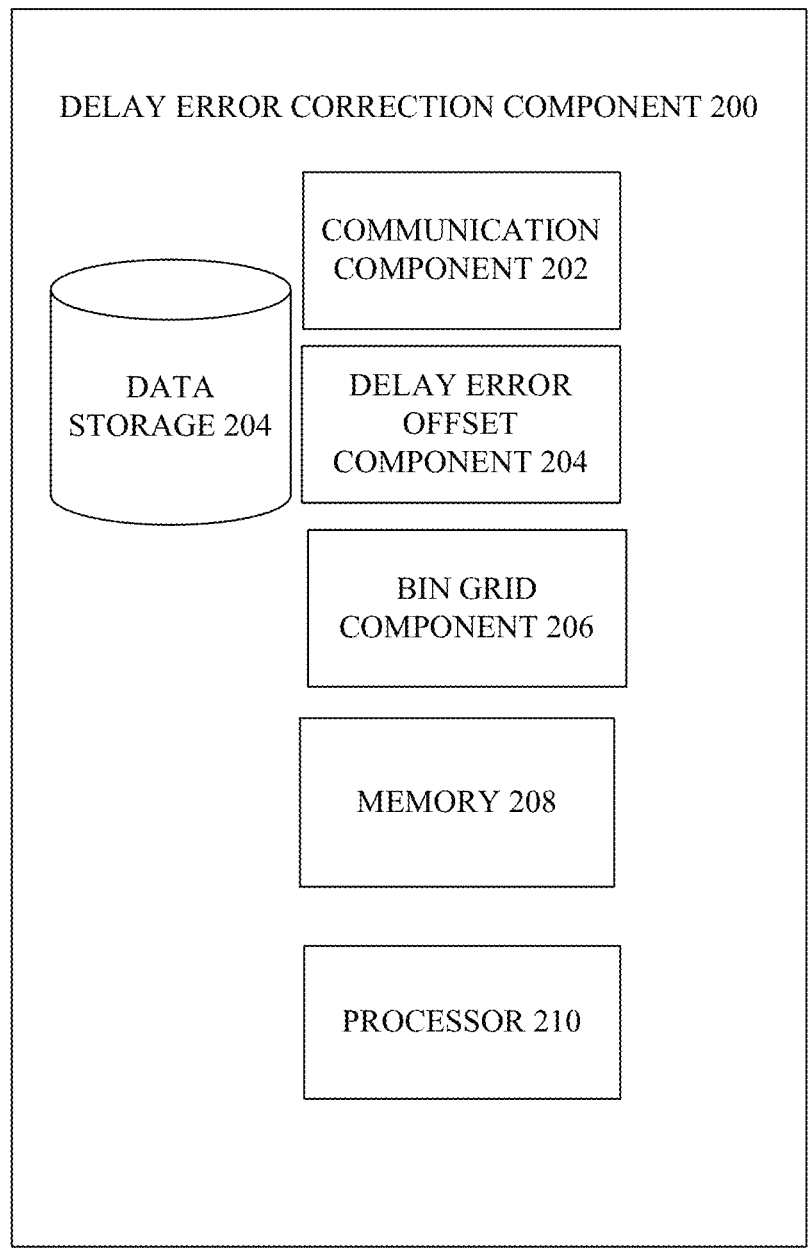
FIG. 2 illustrates an example system that can be employed to facilitate delay error correction in timing-based location systems.
Figure 4:
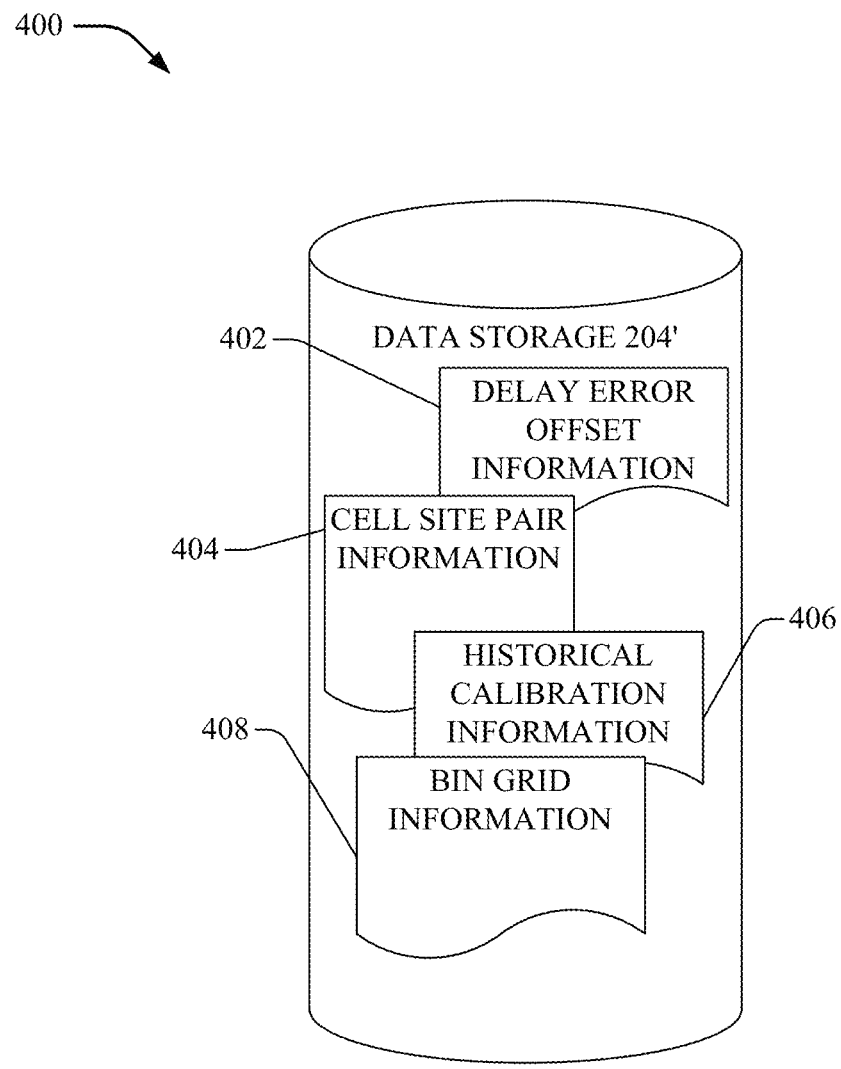
FIG. 4 illustrates an example data storage that facilitates delay error correction in timing-based location systems.

In various embodiments, the structure and/or functionality of the DEC component 104 can be as described with reference to FIGS. 2-7 (or vice versa). Turning first to FIGS. 2, 3 and 4, FIG. 2 illustrates an example system that can be employed to facilitate delay error correction in timing-based location systems. FIG. 3 illustrates an example delay error mitigation grid that can be employed to facilitate delay error correction in timing-based location systems. FIG. 4 illustrates an example data storage that facilitates delay error correction in timing-based location systems.

As shown in FIG. 2, the DEC 200 can include a communication component 202, a delay error offset component 204, bin component 206, memory 208 and/or processor 210. In various embodiments, one or more of the communication component 202, delay error offset component 204, bin component 206, memory 208 and/or processor 210 can be electrically and/or communicatively coupled to one another to perform one or more functions of the DEC 200.

The communication component 202 can transmit and/or receive information to and/or from one or more mobile devices, and/or one or more other cells sites. In some embodiments, the communication component 202 can obtain or determine measurement information associated with a mobile device. For example, the measurement information can include AGPS associated with the geographical location of the mobile device. In some embodiments, the measurement information can include The AGPS information can include latitude and longitude information and/or any other type of information for identifying a geographical location of the mobile device and/or one or more cell sites.

The delay error offset component 204 can provide a real-time, self-updating process to calculate adjustments to the distance between a mobile, and a BS (e.g., $D_i$) and to calculate adjustments to the distance between a mobile$_j$ and the BS (e.g., $D_j$). The adjustments can be delay error offsets in various embodiments.

The adjustments can be employed to correct the measurement information for the location of the mobile device as the measurement information may not account for propagation delay due to signal repeaters, physical structures, seasonal change in foliage and the like. The adjustments can be delay error offsets in various embodiments.

In some embodiments, after the communication component 202 receives the location measurement from the mobile device, the delay error offset component 204 can perform a calibration employing the measurement information.

The delay error offset component 204 can then compare the calibrated result against a previously-stored calibrated result from a past measurement. The delay error offset component 204 can then compute the difference between the current calibrated result and the previously-stored calibrated result can be an error value, $M_{ij}$ such as that shown in Equation 1 below.

$$M_{ij} = O_{ji}R_c - O_{ji}R_h \qquad \text{(Equation 1)}$$

where $_{ij}$ represents physical location pairs of cell sites, $O_{ji}R_c$ is the newly-measured calibration measurement and $O_{ji}R_h$ is the previously-stored, historical calibration measurement.

With each new calibration measurement, the delay error offset component 204 can calculate a new calibration measurement error. In some embodiments, the measurement error can be the root mean square (RMS) error. Accordingly, the measurement error can be updated over time to reflect changes in measurement information (which can result from seasonal changes in foliage, the construction of new physical structures and the like).

The delay error offset component 204 can assign the error value, $M_{ij}$, as being equal to the delay error offset in some embodiments. The offset can be stored in association with the bin that represents the geographical location of the mobile device. Accordingly, offsets can be computed for each bin for each BS site pair.

In these embodiments, the delay error offsets can be applied to future measurements to determine a more accurate distance between the mobile device and the BS.

In various embodiments, collection of measurement information, calibration, computation of measurement error and/or assignment of measurement error to delay error offset can be performed over time, and the results aggregated over time for one or more different mobile devices. As such, the systems and methods described herein can facilitate an accumulation of errors at particular AGPS locations.

Further, in various embodiments, offsets calculated for overlapping locations can be aggregated to improve error estimates and reduce the impact of quantization and mobile device measurement error.

The bin component 206 will be described with reference to FIGS. 2 and 3. The bin component 206 can construct tables and/or information indicative of a bin, such as bin 300 shown in FIG. 3. The bin 300 can represent a physical location covering a region associated with or between two cell sites. In some embodiments, the bin 300 can represent a physical location covering a region associated with the geographical location of a mobile device.

As described above, the bin component 206 can construct the bin with fixed latitude and longitude offset multipliers allowing integer-based x and y coordinates for simplified indexing and lookup. In some embodiments, the bin can be 100 meters (m) wide and 100 m high (although other dimensions for bins are possible and envisioned). In various embodiments, an approximate 100 m² size bin can be constructed with a fixed longitude offset of approximately 0.0012 and a fixed latitude offset of approximately 0.0009. The frames of the bin 300 can be 1/10$^{th}$ the size of the bin 300.

The bin component 206 can receive one or more delay error offsets computed by the delay error offset component 204 for a bin 300. In these embodiments, the bin component 206 can store delay error offset information in the frames of the bin 300.

The bin component 206 can perform extrapolation to assign values in the various frames in some embodiments. In various embodiments, the values are percentages that can represent weights to be applied at geographical locations corresponding to the frame of the bin 300. The values can decrease with increasing distance from the center of the bin 300 in some embodiments.

For example, when the system receives a measurement and an associated AGPS reading, the AGPS reading represents a small area (e.g., 10 m²), as shown in FIG. 3. Because the error in measurement at the frame corresponding to the small area can be larger than the confined area of the frame, the value associated with the frame can be distributed to frames that are adjacent to the frame corresponding to the small area. As shown in FIG. 3, the center frame can be associated with a full weight of the error and the further from the center frame a frame is located, the less weight of the error. As such, the values (as shown in FIG. 3) decrease as the distance from the center frame increases. Each measurement received can be processed according to such approach and the values employed for the weights can aggregate with a plurality of measurements.

FIG. 3 shows one example of percentages for corresponding frames. In particular, the bin component 300 employs extrapolation to assign the frames percentage values three levels from the center location of the bin 300. The center location reflects the latitude and longitude location of the actual measurement from the mobile device in some embodiments.

The values can be percentages ranging from 0 percent to 100 percent. Each measurement can be applied to the four adjacent frames, and three levels out with a measurement weighting. 100% weighting will be applied to measurements made at the center frames. 75% weighting will be applied to measurements made at the first level adjacent frames. 50% weighting will be applied at the second level frames, and 25% at the third level frames. For each frame, the bin component 206 can provide to the data storage 204 the delay error offset information, timestamp and percentage weighting information. Other values are possible in other embodiments and are envisaged.

When determining the delay error offset to use during the mobile locating process, all of the measurements with corresponding weights can be used in aggregate to output a single delay error constant.

For example, the weights can be as shown in FIG. 3. By way of example, the center frame of FIG. 3 can be assigned the location corresponding to an AGPS measurement from the mobile device. The error calculation can be used at full weight (100%) for the 4 center frames. The error can have less weight, at the next layer (75%) and at subsequent layers (e.g., the next layer (50%), and the next layer (25%)). Accordingly, an error can be assigned from the calculation to the frames having values corresponding to 25%. However, such frames contribute only 25% of the weighting when used in aggregate with other measurements/AGPS locates.

In some embodiments, Equation 1 can be the error formula for each occurrence (i.e., for each measurement and AGPS location). The measurement can be then weighted by the above-mentioned values and applied across frames that are adjacent to those of the center frame (which represents the location of the measurement). The multiple measurements that are weighed can then be aggregated on a per frame basis to determine an aggregate the measurement and apply across adjacent bins, as shown in FIG. 3, then we aggregate multiple measurements on a per bin basis to come up with an aggregate $M_{ij}$ for each 10 m² frame.

During the locating process, if an $M_{ij}$ value exists for a given frame under evaluation, the error offset can be applied to improve location estimation in some embodiments. If an $M_{ij}$ doesn't exist for a frame, then no $M_{ij}$ is used.

In various embodiments, the $M_{ij}$ value can be used in different types of locating algorithms (e.g., multi-lateration, hyperbolic, and timed fingerprint locating algorithms), and can prove equally effective across each to improve the result.

Over time, the accuracy of the measurements may weaken in value due to changes in actual clutter (e.g., trees, buildings, other obstructions). When a minimum of two new measurements result in a significant difference from prior measurements, prior measurements can be discarded for the bin representing such geographical area from which measurements were received, and all measurements which were extrapolated at three levels out from the bin, and can be fully replaced by the new measurements.

Further, in various embodiments, a rolling history of the delay error offset information and weights over time can be stored. Feedback statistics can be employed to determine the optimal time period over which to store delay error offset information and weights.

The memory 208 can be a computer-readable storage medium storing computer-executable instructions and/or information for performing the functions described herein with reference to the DEC 200. For example, the memory 208 can store information including, but not limited to, delay error offset information, newly-measured and historical calibration information, AGPS information, bin weights, timestamp information or the like. Processor 210 can perform one or more of the functions described herein with reference to the DEC 200.

Turning now to FIG. 4, in various embodiments, the data storage 204, 204' can include various different type of information for determining delay error offset information. By way of example, but not limitation, the data storage 204, 204' can include delay error offset information 402, cell site pair information 404, historical calibration information 406 and/or bin information 408.

In various embodiments, the delay error offset information 402 can include delay error offsets computed over time for particular bins for cell site pairs, the cell site pair information 404 can include information identifying the cell site pairs, the historical calibration information 406 can include stored calibration information computed from previous measurements calibrated, and/or the bin information can include information indicative of the values shown in FIG. 3 and/or information identifying the configuration of values within a particular bin.

FIGS. 5, 6, 7, 8 and 9 illustrate example flowcharts of methods that facilitate delay error correction in timing-based location systems.

Figure 5:
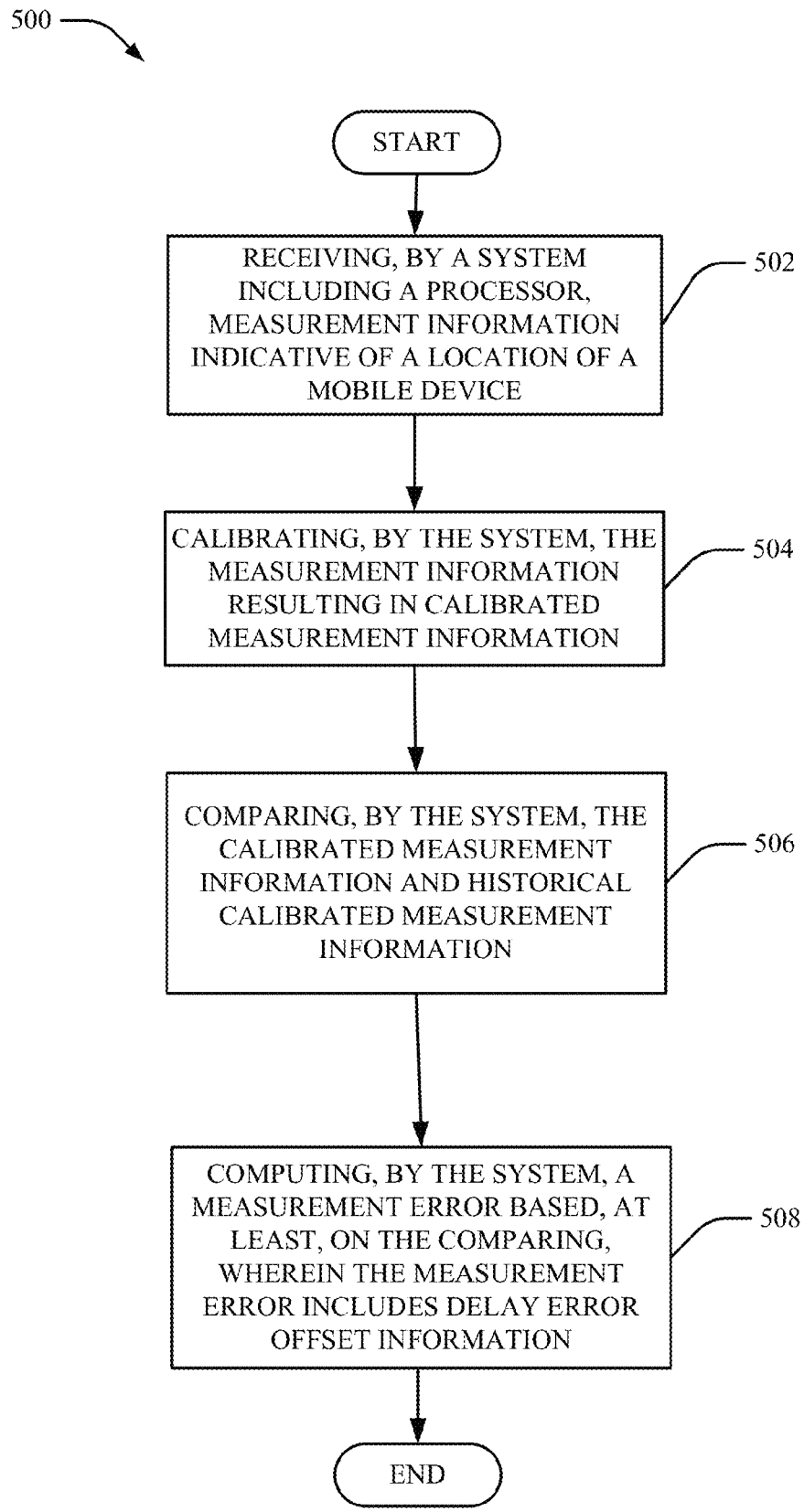
FIGS. 5, 6, 7, 8 and 9 illustrate example flowcharts of methods that facilitate delay error correction in timing-based location systems.

Turning first to FIG. 5, at 502, method 500 can include receiving, by a system including a processor, measurement information indicative of a location of a mobile device. At 504, method 500 can include calibrating, by the system, the measurement information resulting in calibrated measurement information. At 506, method 500 can include comparing, by the system, the calibrated measurement information and historical calibrated measurement information. At 508, method 500 can include computing, by the system, a measurement error based, at least, on the comparing, wherein the measurement error includes delay error offset information. Although not shown, in various embodiments, the delay error offset information can be applied to subsequently received measurement information indicative of a location of a mobile device. The applied delay error offset information can be employed in improving the locating ability of the systems described herein.

Figure 6:
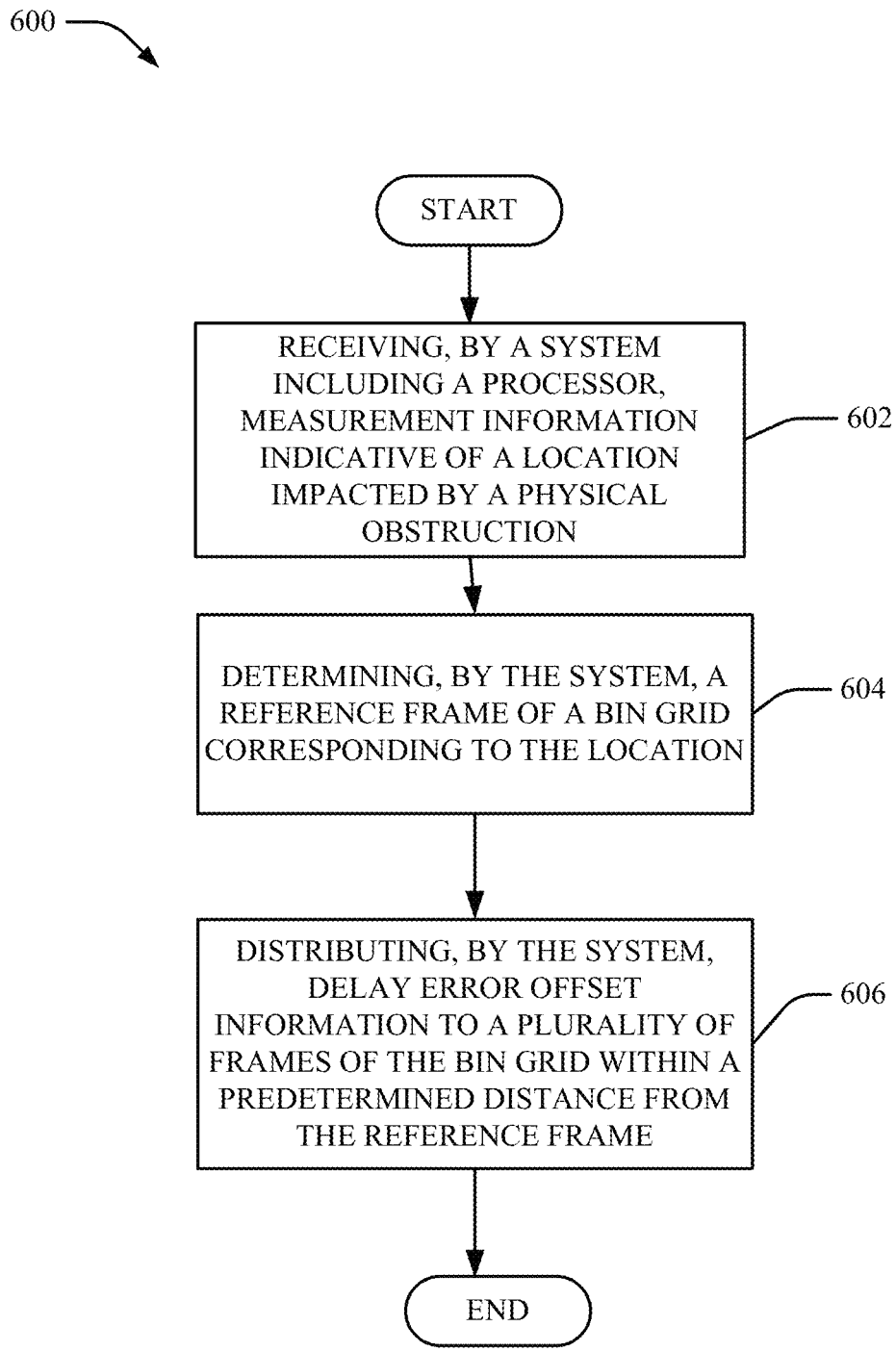

Turning now to FIG. 6, at 602, method 600 can include receiving, by a system including a processor, measurement information indicative of a location impacted by a physical obstruction. At 604, method 600 can include determining, by the system, a reference frame of a bin corresponding to the location. At 606, method 600 can include distributing, by the system, delay error offset information to a plurality of frames of the bin within a predetermined distance from the reference frame.

Figure 7:
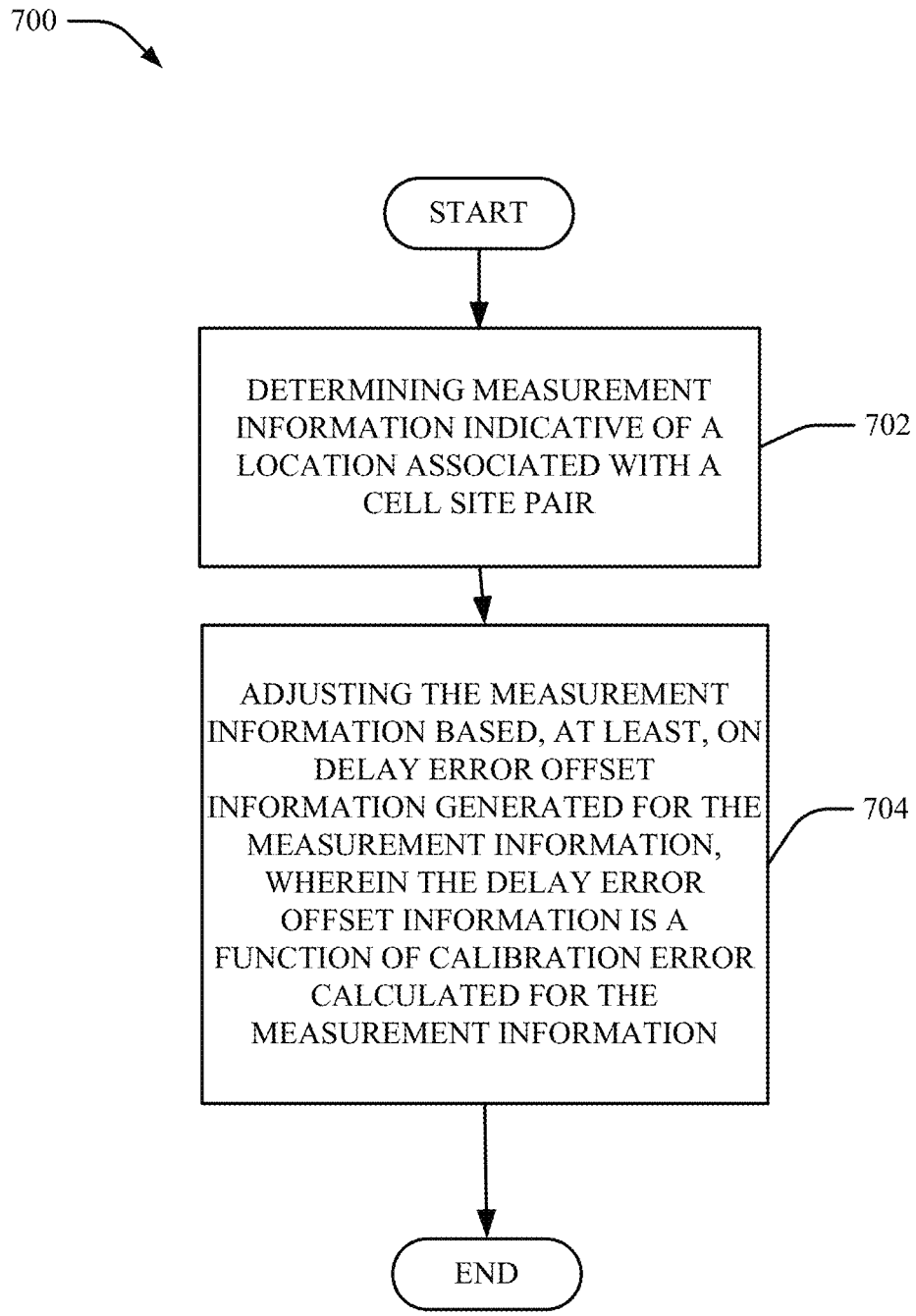

Turning now to FIG. 7, at 702, method 700 can include determining measurement information indicative of a location associated with a cell site pair. At 704, method 700 can include adjusting the measurement information based, at least, on delay error offset information generated for the measurement information, wherein the delay error offset information is a function of calibration error calculated for the measurement information.

Figure 8:
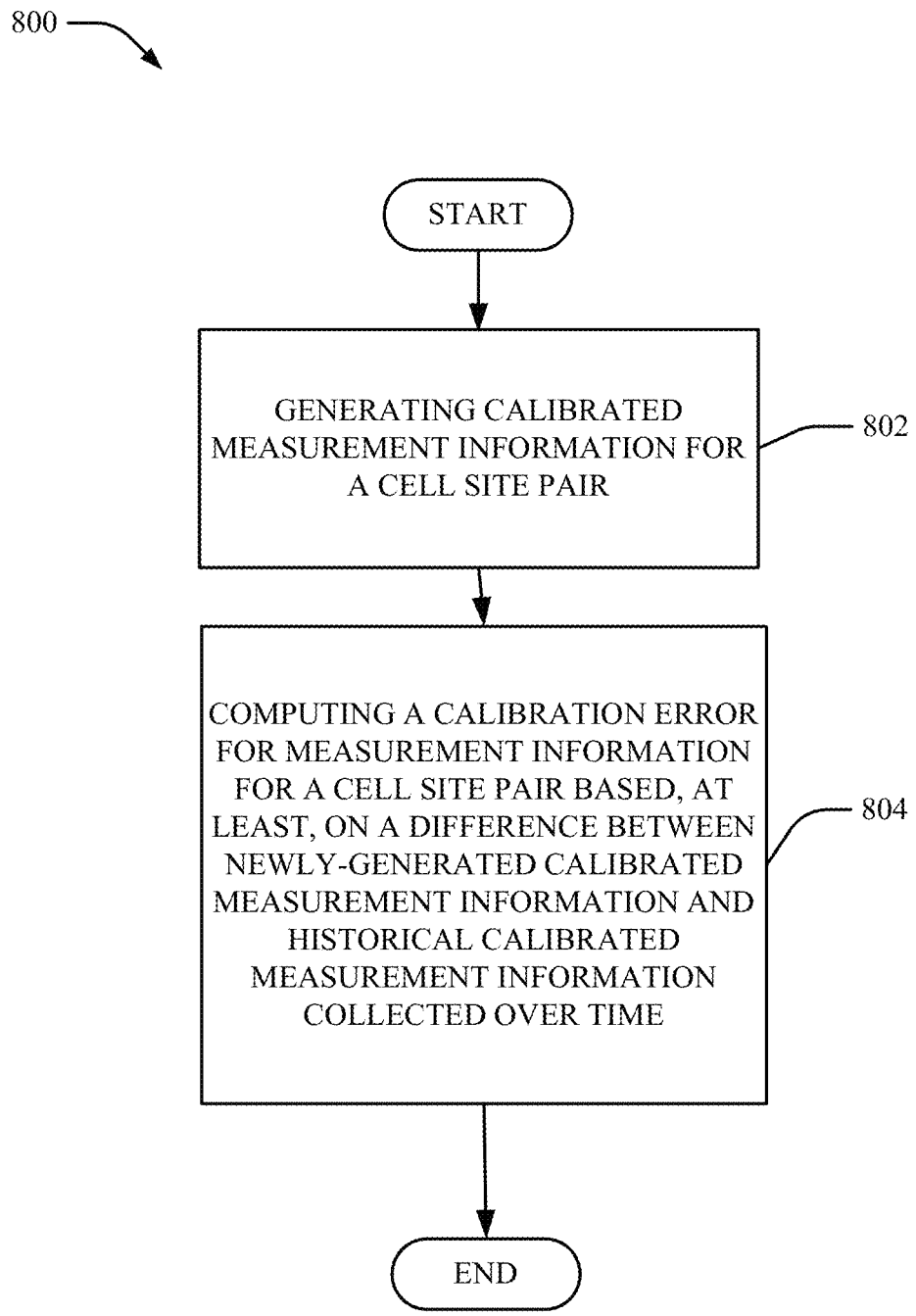

Turning now to FIG. 8, at 802, method 800 can include generating calibrated measurement information for a cell site pair. At 804, method 800 can include computing a calibration error for the measurement information for the cell site pair based, at least, on a difference between the newly-generated calibration measurement information and historical calibrated measurement information collected over time.

Figure 9:
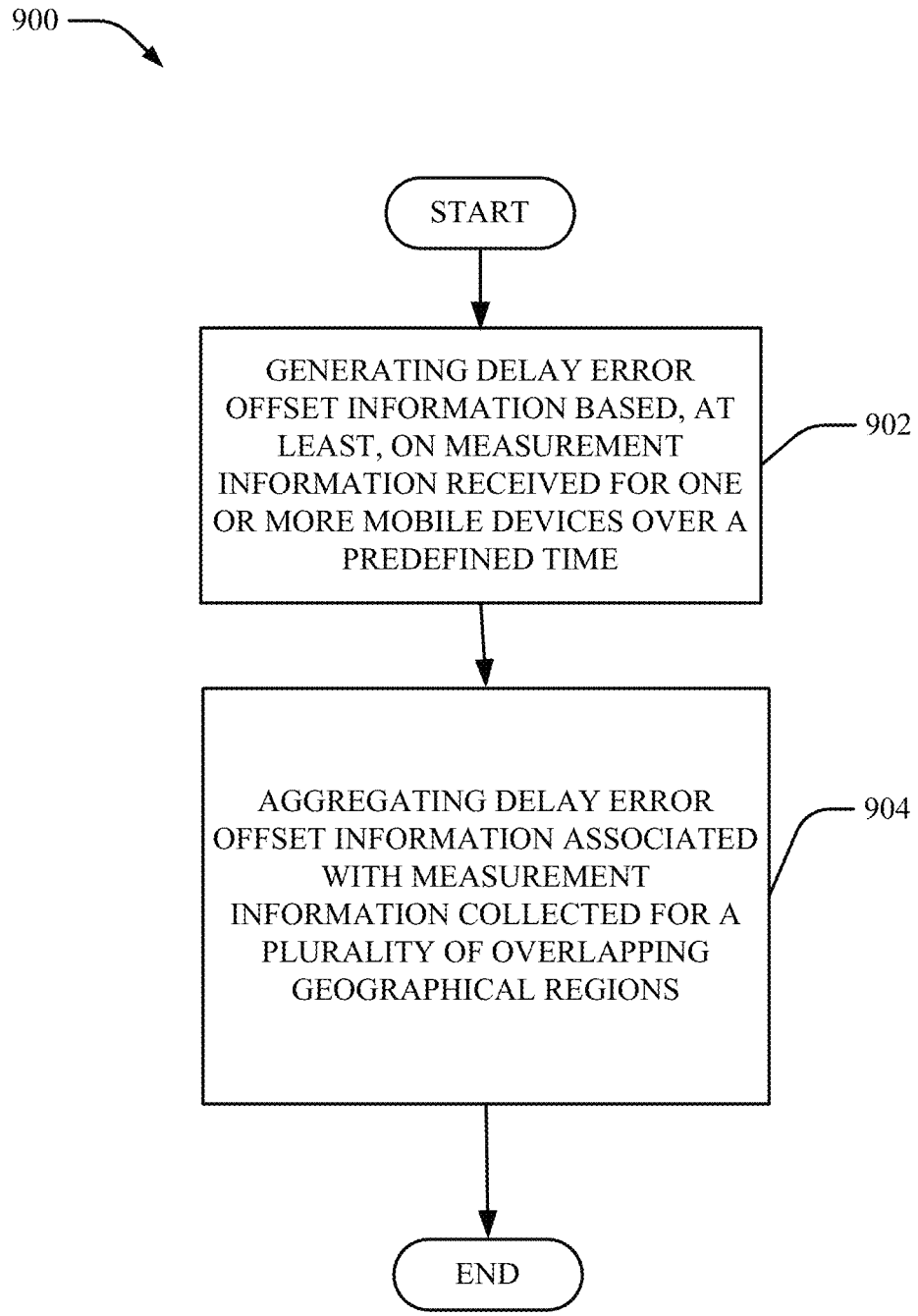

Turning now to FIG. 9, at 902, method 900 can include generating delay error offset information based, at least, on measurement information received for one or more mobile devices over a predefined time. At 904, method 900 can include aggregating delay error offset information associated with measurement information collected for a plurality of overlapping geographical regions.

Figure 10:
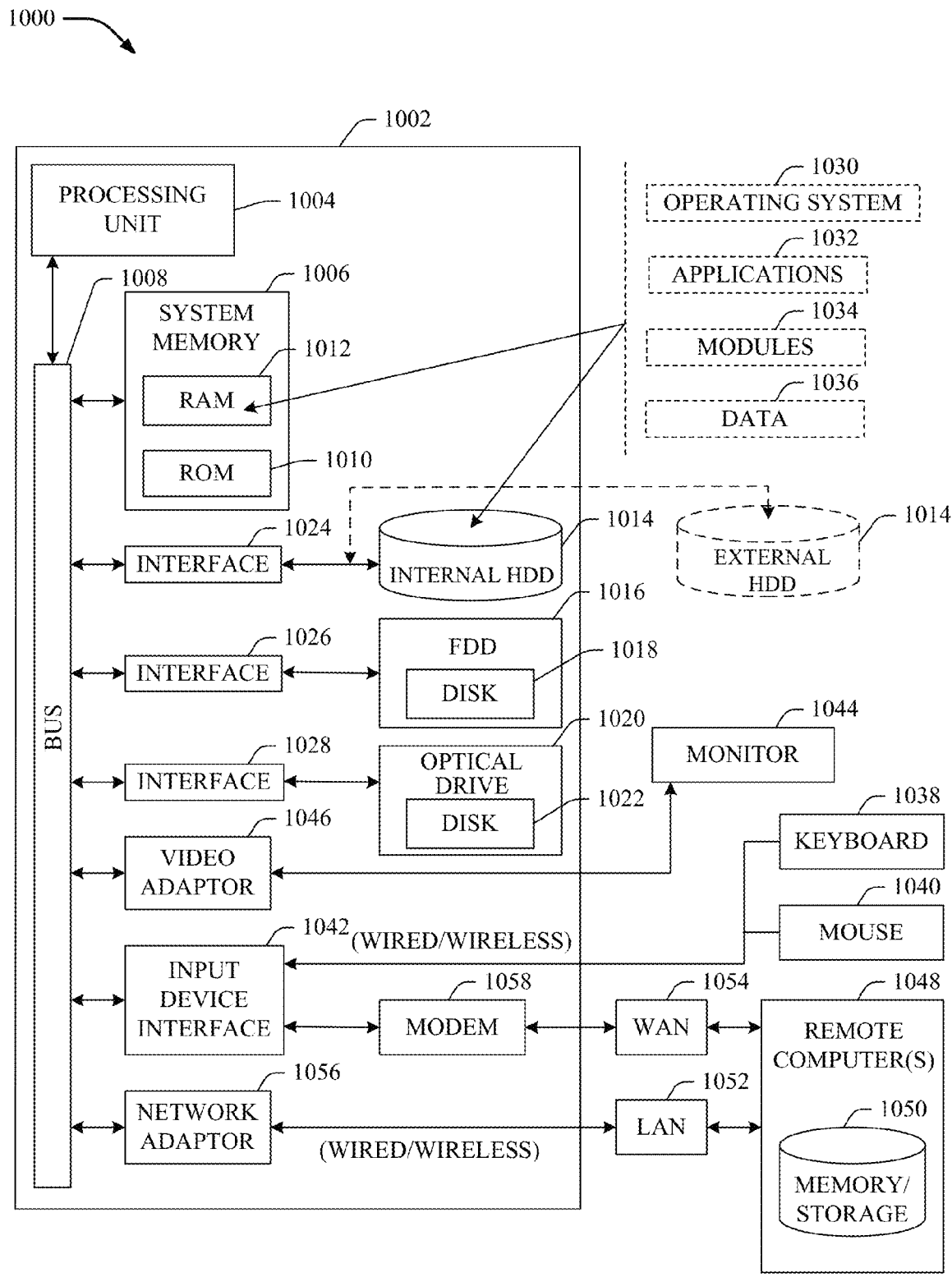
FIG. 10 illustrates a block diagram of a computer operable to facilitate delay error correction in timing-based location systems.

Referring now to FIG. 10, there is illustrated a block diagram of a computer operable to facilitate delay error correction in timing-based location systems. In order to provide additional context for various embodiments of the embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the embodiments includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory 1010 such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the serial port interface 1042. In a networked environment, program modules depicted relative to the computer 1002 or portions thereof, can be stored in the remote memory/storage device 1050. It can be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and BLUETOOTH® wireless technologies. Thus, the communication can be a predefined structure as with a conventional network or simply an ad hoc communication between at least two devices.

Wireless Fidelity (Wi-Fi) can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 13 Mbps (802.13a) or 54 Mbps (802.13b) data rate, for example or with products that contain both bands (dual band), so the networks can provide real-world performance similar to the basic 10BaseT wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As can be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites can benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It can be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   comparing, by a system comprising a processor, calibrated measurement information and historical calibrated measurement information, wherein the calibrated measurement information and the historical calibrated measurement information are associated with measurement information indicative of a location of a mobile device; and
   determining, by the system, a measurement error based on a result of the comparing, wherein the measurement error comprises delay error offset information.

2. The method of claim 1, wherein the measurement information comprises assisted global positioning system measurement information.

3. The method of claim 1, further comprising storing, by the system, the delay error offset information in association with a bin, wherein the bin is representative of the location of the mobile device.

4. The method of claim 3, further comprising:
determining, by the system, weights to be applied to frames of the bin, wherein the weights change in value based on a change in value of a distance from a defined center of the bin.

5. The method of claim 4, wherein the weights range from about zero to about one.

6. The method of claim 1, further comprising:
applying, by the system, the delay error offset information to subsequently received measurement information indicative of a subsequent location of the mobile device.

7. The method of claim 1, further comprising:
aggregating, by the system, the measurement information for the location received by the system over a period of time.

8. A method, comprising:
determining, by a device comprising a processor, a reference frame of a bin, wherein the bin corresponds to a position associated with measurement information indicative of a location impacted by a physical obstruction; and
distributing delay error offset information to frames of the bin within a defined distance from the reference frame, wherein the delay error offset information comprises a weighting of the frames within the defined distance by respective values.

9. The method of claim 8, wherein the respective values are between about 0% and about 100%.

10. The method of claim 8, wherein the respective values change in value as a distance from the reference frame to the location to the frames changes.

11. The method of claim 8, wherein the measurement information comprises assisted global positioning system information.

12. A system, comprising:
a processor; and
a memory that stores executable instructions that, when executed by the processor, facilitate performance of operations, comprising:
determining measurement information indicative of a location associated with a pair of cell site devices; and
adjusting the measurement information as a function of delay error offset information generated for the measurement information, wherein the delay error offset information is a function of calibration error determined for the measurement information.

13. The system of claim 12, wherein the operations further comprise:
generating calibrated measurement information by calibrating the measurement information; and
determining the calibration error based on a difference between the calibrated measurement information and historical calibrated measurement information.

14. The system of claim 12, wherein the operations further comprise:
associating the delay error offset information with the location associated with the pair of cell site devices.

15. The system of claim 12, wherein the operations further comprise:
locating a mobile device communicatively coupled to the pair of cell site devices, wherein the locating is based on the measurement information and the delay error offset information.

16. The system of claim 15, wherein the locating is further based on weights applied to the measurement information, and wherein the weights are representative of physical structures in a geographical region covered by the location.

17. The system of claim 16, wherein the weights have values between about zero percent and about 100 percent.

18. The system of claim 12, wherein the operations further comprise:
aggregating the measurement information for the location over a defined period of time.

19. The system of claim 12, wherein the operations further comprise:
aggregating the delay error offset information for the location over a defined period of time.

20. The system of claim 12, wherein the measurement information comprises assisted global positioning system measurement information.

* * * * *